United States Patent
Hyodo et al.

(10) Patent No.: US 12,401,115 B2
(45) Date of Patent: Aug. 26, 2025

(54) VEHICLE UPPER STRUCTURE

(71) Applicant: TOYOTA JIDOSHA KABUSHIKI KAISHA, Aichi-ken (JP)

(72) Inventors: Hiroki Hyodo, Toyota (JP); Masaya Miura, Toyota (JP); Koichiro Ueno, Nagoya (JP); Shintaro Kitakata, Nissin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 107 days.

(21) Appl. No.: 18/525,849

(22) Filed: Dec. 1, 2023

(65) Prior Publication Data

US 2024/0186688 A1    Jun. 6, 2024

(30) Foreign Application Priority Data

Dec. 5, 2022   (JP) .................................. 2022-194043

(51) Int. Cl.
*H01Q 1/32* (2006.01)
*B62D 25/06* (2006.01)
*B60R 11/02* (2006.01)

(52) U.S. Cl.
CPC ............ *H01Q 1/3275* (2013.01); *B62D 25/06* (2013.01); *B60R 11/02* (2013.01)

(58) Field of Classification Search
CPC ........ H01Q 1/32; H01Q 1/243; H01Q 1/3275; H01Q 1/42; H01Q 9/0407
See application file for complete search history.

(56) References Cited

U.S. PATENT DOCUMENTS

| | | | |
|---|---|---|---|
| 7,847,744 B2* | 12/2010 | Mierzwa ................ | H01Q 1/288 343/711 |
| 11,233,318 B2* | 1/2022 | Imamura .................. | H01Q 1/48 |
| 11,456,525 B2* | 9/2022 | Katsura ................ | H01Q 1/3208 |
| 12,057,625 B1* | 8/2024 | Ishida ................... | H01Q 1/3275 |
| 2021/0057806 A1 | 2/2021 | Katsura et al. | |
| 2022/0177040 A1 | 6/2022 | Asai et al. | |

FOREIGN PATENT DOCUMENTS

| | | |
|---|---|---|
| EP | 2468544 A1 | 6/2012 |
| JP | 2011-078020 A | 4/2011 |
| JP | 2012131338 A | 7/2012 |
| JP | 2022089619 A | 6/2022 |
| WO | 2019/150666 A1 | 8/2019 |

* cited by examiner

*Primary Examiner* — Hasan Islam
(74) *Attorney, Agent, or Firm* — HAUPTMAN HAM, LLP (57) ABSTRACT

A vehicle upper structure disclosed in the present specification comprises a roof panel having a communication opening formed therein; a roof reinforcement disposed near a front end of the communication opening and joined to the roof panel; a rear header disposed near a rear end of the communication opening and joined to the roof panel; and an antenna plate that supports a communication device and is connected to the roof reinforcement and the rear header, wherein the rear header is joined to the roof panel at a front end and a rear end thereof, and forms a first closed space elongated in a vehicle width direction between the rear header and the roof panel.

4 Claims, 5 Drawing Sheets

VEHICLE UPPER STRUCTURE

CROSS REFERENCE TO RELATED APPLICATION

This application claims priority to Japanese Patent Application No. 2022-194043 filed on Dec. 5, 2022, which is incorporated herein by reference in its entirety including the specification, claims, drawings, and abstract.

TECHNICAL FIELD

This specification discloses an upper structure of a vehicle.

BACKGROUND

Conventionally, it has been proposed to arrange a communication device such as an antenna in an upper portion of a vehicle. For example, Patent Document 1 discloses a technology in which an opening is provided in a roof panel of a vehicle and an antenna module is disposed in the opening. In Patent Document 1, the antenna module is covered with a redome made of a resin capable of transmitting radio waves.

Recently, communication devices have increased in size in order to improve communication performance. When a large-sized communication device is disposed, the opening of the roof panel must be increased. However, if the opening is increased, the rigidity of the vehicle body at the periphery of the opening may be reduced, and deformation of the vehicle body may occur.

Therefore, it has been proposed in part to form a skeleton-shaped portion around the opening. However, when an excessively large skeleton-shaped portion is provided, the communication device or the skeleton-shaped portion extends to the vehicle compartment side, and the space in the vehicle compartment becomes narrow.

Accordingly, the present specification discloses a vehicle upper structure capable of achieving both the rigidity of the vehicle body and the space in the vehicle compartment.

CITATION LIST

PATENT DOCUMENT 1: WO 2019/150666 A1

SUMMARY

The vehicle upper structure disclosed in the present specification comprises a roof panel having a communication opening formed therein; a roof reinforcement disposed near a front end of the communication opening and joined to the roof panel; a rear header disposed near a rear end of the communication opening and joined to the roof panel; and an antenna plate that supports a communication device and is connected to the roof reinforcement and the rear header, wherein the rear header is joined to the roof panel at a front end and a rear end thereof, and forms a first closed space elongated in a vehicle width direction between the rear header and the roof panel.

By joining the rear header and the roof panel and forming the first closed space between the rear header and the roof panel, high rigidity can be ensured while suppressing the dimension of the rear header in the front-rear direction. By reducing the dimension of the rear header in the front-rear direction, the communication device can be disposed rearward of the vehicle. Thus, the communication device can be prevented from protruding to the vehicle compartment side. As a result, according to the above configuration, it is possible to achieve both the rigidity of the vehicle body and the space of the vehicle compartment.

In this case, the rear header may comprise a front wall portion; a vertical wall portion extending from a rear end of the front wall portion toward a lower side of the vehicle; a rear wall portion extending from a lower end of the vertical wall portion toward a rear side of the vehicle; and a groove-shaped portion formed in the rear wall portion and forming the first closed space between the groove-shaped portion and the roof panel, and wherein the rear header may be joined to the roof panel at a first joining point located at a rear side of the vehicle relative to the groove-shaped portion, a second joining point located at the vertical wall portion, and a third joining point located at the front wall portion.

The rear header may form a second closed space between the rear header and the roof panel at a portion between the second joining point and the third joining point.

With this configuration, the rigidity of the vehicle body in the vicinity of the rear end of the communication opening can be further improved.

The antenna plate may include a mounting portion to which the communication device is mounted, a hanging portion extending from a rear end of the mounting portion toward a lower side of the vehicle, and a terminal portion extending from a lower end of the hanging portion toward a rear side of the vehicle; and an terminal portion of the antenna plate is connected to the rear wall portion of the rear header.

With such a configuration, it is possible to secure a large vertical dimension of the antenna plate without narrowing the cabin. This increases the section modulus of the antenna plate, thereby further improving the rigidity of the vehicle body in the vicinity of the rear end of the communication opening.

A density of a joining point between the rear header and the roof panel at an end region in the vehicle width direction of the roof panel may be higher than the density of the joining point at a center region in the vehicle width direction of the roof panel.

With such a configuration, since the rigidity of the vehicle body at the vehicle width direction end portion can be increased, it is possible to effectively suppress matchbox deformation of the vehicle.

According to the vehicle upper structure disclosed in the present specification, it is possible to achieve both the rigidity of the vehicle body and the space of the cabin.

BRIEF DESCRIPTION OF DRAWINGS

Embodiment(s) of the present disclosure will be described based on the following figures, wherein.

DESCRIPTION OF EMBODIMENT

Figure 1:
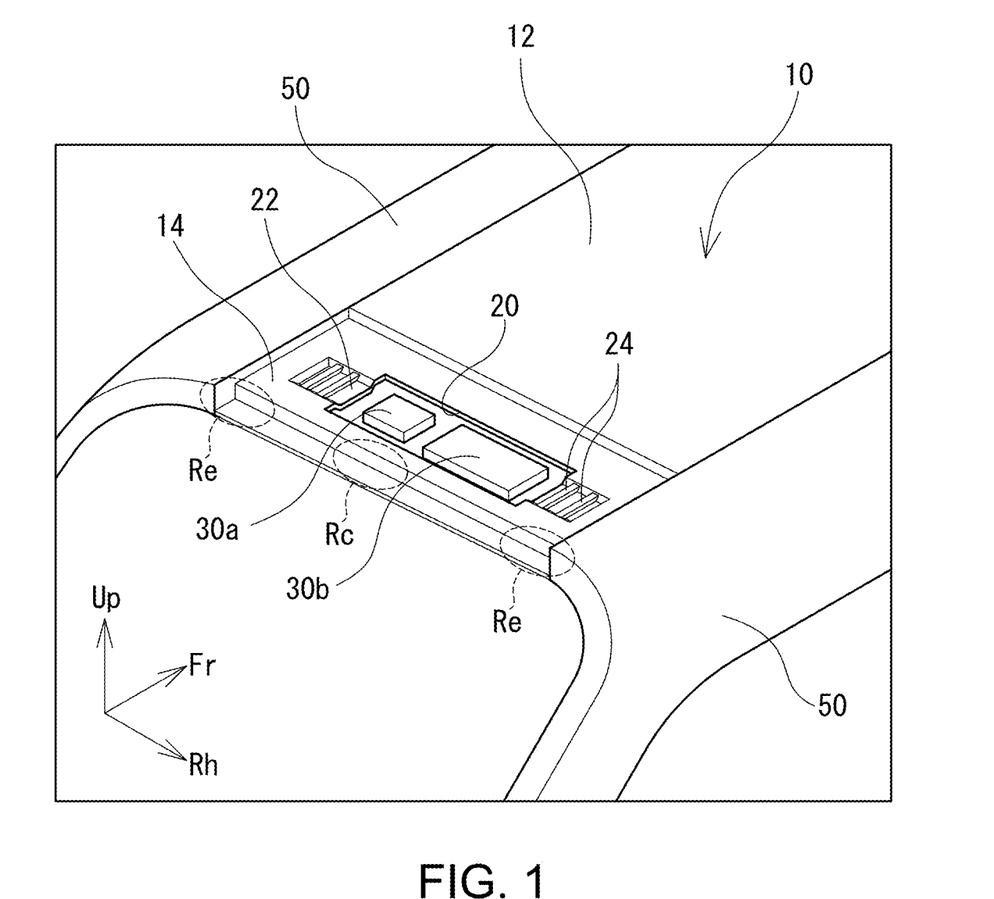
FIG. 1 is a perspective view of an upper portion of a vehicle.
Figure 2:
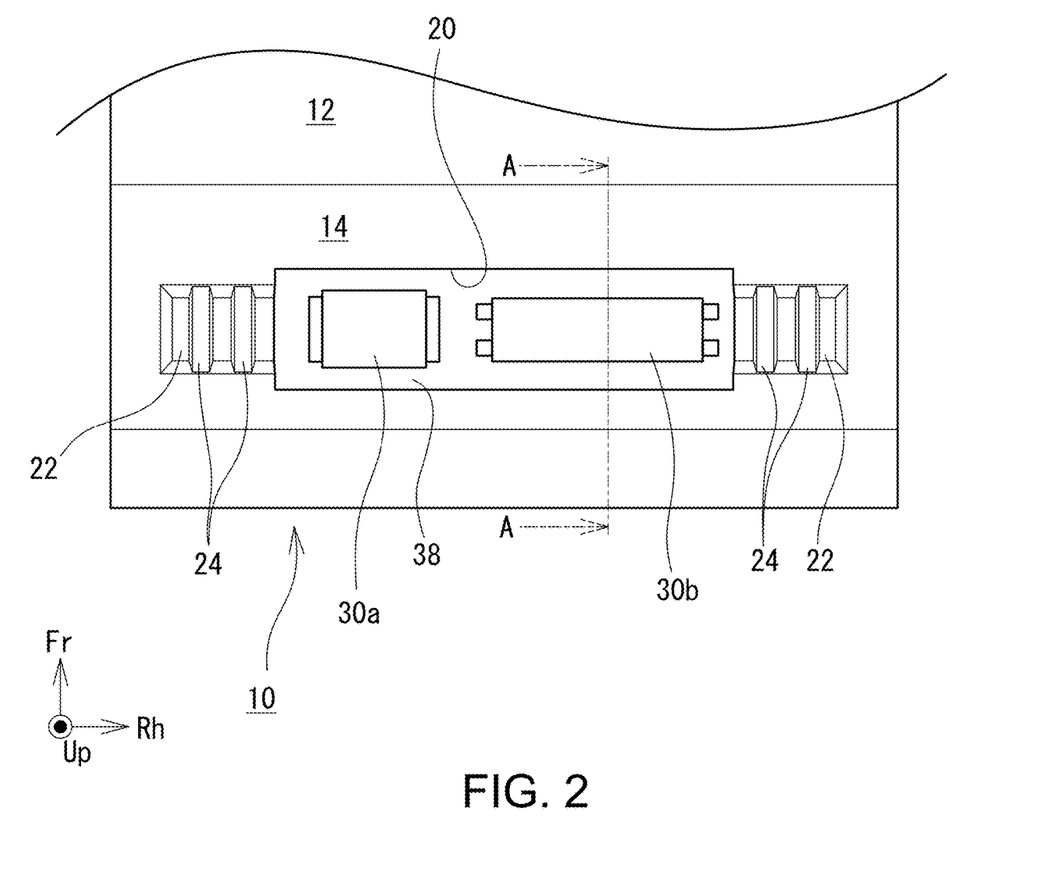
FIG. 2 is a plan view of the periphery of a communication device.
Figure 3:
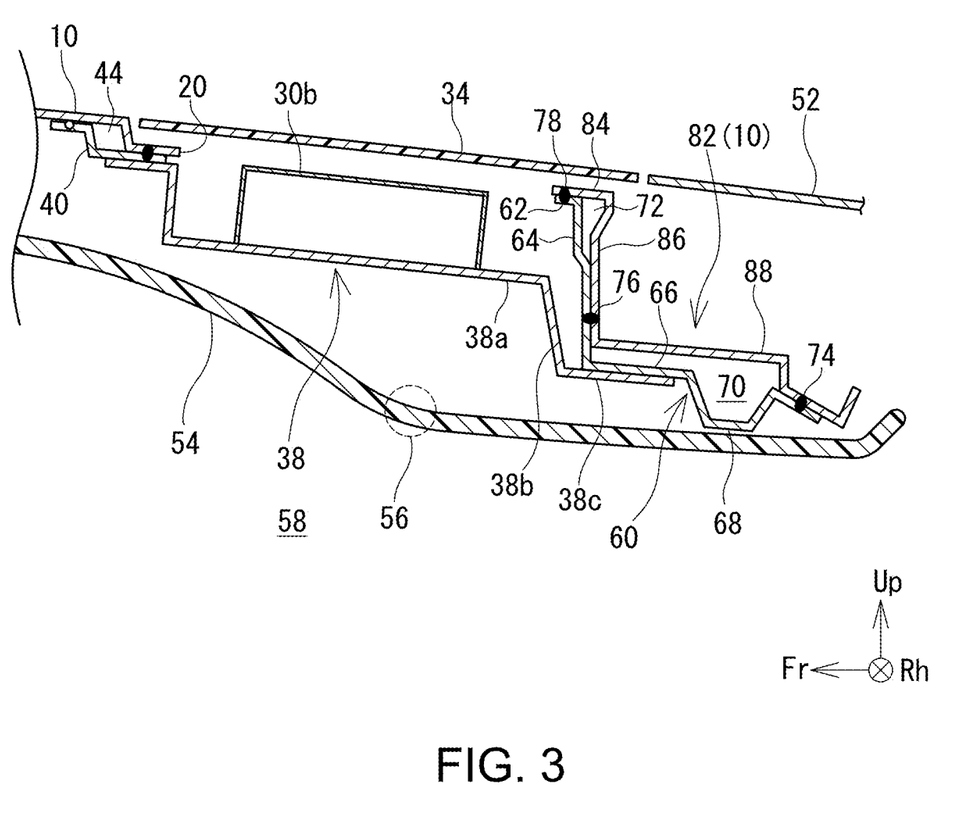
FIG. 3 is a cross-sectional view taken along the line A-A in FIG. 2.

Hereinafter, an upper structure of a vehicle will be described with reference to the drawings. FIG. 1 is a perspective view of an upper portion of a vehicle; FIG. 2 is a plan view of the periphery of the communication device 30. FIG. 3 is a cross-sectional view taken along the line A-A of FIG. 2. In FIGS. 1 to 3, some members unnecessary for explanation are not shown. For example, in FIGS. 1 and 2, illustration of the resin cover 34 is omitted. In FIGS. 1 to 3, the rear panel 52 and/or the side member outer panel 50 are not shown. In the drawings, "Up", "Fr" and "Rh" indicate the upper side, the front side and the right side of the vehicle, respectively. Further, in FIG. 3, black ovals indicate joining points where members are joined by welding.

As shown in FIG. 1, a roof panel 10 is disposed above the vehicle. Side member outer panels 50 are connected to both left and right sides of the roof panel 10. The side member outer panel 50 is a panel material constituting a side surface of the vehicle.

The roof panel 10 is a panel material constituting the upper surface of the vehicle, and is usually made of metal such as steel. The roof panel 10 includes a design surface 12 and a placement surface 14. The design surface 12 is an outer surface of the roof panel 10 and is exposed to the outside of the vehicle. The design surface 12 occupies most of the roof panel 10. The placement surface 14 is a surface slightly recessed downward from the design surface 12. The placement surface 14 is disposed at the rear end of the roof panel 10. The placement surface 14 is covered with a resin cover 34 (see FIG. 3) described later.

Here, in the present specification, a portion of the roof panel 10 behind the communication opening 20 is referred to as a "rear end portion 82". As shown in FIG. 3, the rear end portion 82 includes a front wall portion 84 extending in a substantially horizontal direction, a vertical wall portion 86 extending downward from the rear end of the front wall portion 84, and a rear wall portion 88 extending rearward from the lower end of the vertical wall portion 86. The rear end portion 82 forms a first closed space 70 and a second closed space 72 between the rear header 60 and the rear end portion 82.

On the placement surface 14, a communication opening 20, a recessed portion 22, and a plurality of beads 24 are formed. The communication opening 20 is a substantially rectangular opening elongated in the vehicle width direction. For example, the dimension of the communication opening 20 in the vehicle width direction is ½ or more of the dimension of the roof panel 10 in the vehicle width direction. The communication opening 20 is formed in order to transmit radio waves well. The communication module 30a and the antenna 30b described later are disposed inside the communication opening 20 in plan view.

A total of two recessed portions 22 are formed on both sides of the communication opening 20 in the vehicle width direction. The recessed portion 22 is a portion depressed further toward the vehicle inner side (i.e., the lower side) from the placement surface 14. The recessed portion 22 is connected to an end portion of the communication opening 20 in the vehicle width direction. The recessed portion 22 is substantially rectangular in plan view.

The bead 24 is a convex bead protruding from the recessed portion 22. The bead 24 extends in the longitudinal direction of the vehicle. The top surface of the bead 24 is lower than the placement surface 14. In other words, the bead 24 does not protrude outward from the design surface 12 of the roof panel 10. By forming the bead 24, the rigidity of the roof panel 10 is improved, and deformation of the roof panel 10 around the communication opening 20 is effectively suppressed.

The communication module 30a and the antenna 30b are fixed to the roof panel 10 so as not to protrude outward from the design surface 12 of the roof panel 10. The antenna 30b transmits and receives radio waves for data communication. In this example, the antenna 30b has a flat plate-shaped or box-shaped main body. The communication module 30a is a device that transmits and receives data to and from other communication devices. The communication module 30a controls transmission and reception of radio waves via the antenna 30b. Hereinafter, when the communication module 30a and the antenna 30b are not distinguished from each other, they are referred to as a "communication device 30".

Both the communication module 30a and the antenna 30b are positioned inside the communication opening 20 in a plan view. In other words, the communication module 30a and the antenna 30b are not covered with the roof panel 10 made of a steel material. When the resin cover 34 is detached, both the communication module 30a and the antenna 30b are exposed to the outside. With such a configuration, since the radio wave for communication is not blocked by the roof panel 10, the radio wave can be satisfactorily transmitted and received.

The communication module 30a and the antenna 30b are attached to the antenna plate 38 (see FIG. 3) by a fastening member (not shown) such as a bolt. The antenna plate 38 is a plate material that supports the communication module 30a and the antenna 30b. As shown in FIG. 3, the antenna plate 38 includes a mounting portion 38a to which the communication device 30 is mounted, a hanging portion 38b extending from the rear end of the mounting portion 38a toward the vehicle rear side, and a terminal portion 38c extending from the lower end of the hanging portion 38b toward the vehicle rear side. The antenna plate 38 is fastened to a roof reinforcement 40 (hereinafter referred to as a "roof RF 40") and a rear header 60, which will be described later, by a fastening member such as a bolt. In other words, the antenna plate 38 and the communication device 30 are fixed to the roof panel 10. Fastening of the antenna plate 38 to the roof RF 40 and the rear header 60 is performed, for example, from the cabin 58 side.

As shown in FIG. 3, the roof RF 40 is a panel material bonded to the lower surface of the roof panel 10 in order to reinforce the roof panel 10. The roof RF 40 is disposed near the front end of the communication opening 20. The roof RF 40 is fixed to the roof panel by welding or the like. The roof RF 40 has a substantially L-shaped cross-sectional shape. The roof RF 40 forms a front closed space 44 elongated in the vehicle width direction between the roof RF 40 and the roof panel 10.

The rear header 60 is also a panel material bonded to the lower surface of the roof panel 10 in order to reinforce the roof panel 10. The rear header 60 is disposed near the rear end of the communication opening 20. The rear header 60 is fixed to the roof panel 10 by welding or the like.

The rear header 60 includes a front wall portion 62, a vertical wall portion 64 extending from a rear end of the front wall portion 62 toward a lower side, and a rear wall portion 66 extending from a lower end of the vertical wall portion 64 toward a rear side. Further, a groove-shaped portion 68 extending in the vehicle width direction is formed in the rear wall portion 66. The groove-shaped portion 68 forms a first closed space 70 elongated in the vehicle width direction between the groove-shaped portion 68 and the rear wall portion 88 of the roof panel 10. Further, a slight unevenness is formed on the vertical wall portion 64. Due to the irregularities, the vertical wall portion 64 forms a second closed space 72 elongated in the vehicle width direction between the vertical wall portion 64 and the vertical wall portion 86 of the roof panel 10.

The rear header 60 is joined to the roof panel 10 at a first joining point 74 located at a rear side of located at a rear side of the vehicle relative to the groove-shaped portion 68, a second joining point 76 located at the vertical wall portion 64, and a third joining point 78 located at the front wall portion 62. Here, the first joining point 74 and the third joining point 78 can be regarded as the rear end and the front end of the rear header 60. Accordingly, the rear header 60 is joined to the roof panel 10 at the front end and the rear end thereof. The terminal portion 38c of the antenna plate 38 is connected to the rear wall portion 66 of the rear header 60. The reason why the rear header 60 has such a configuration will be described later.

As shown in FIG. 3, the resin cover 34 covers the entire placement surface 14 from above. In other words, the resin cover 34 covers the entire bead 24 and the communication device 30 from above. Therefore, neither the bead 24 nor the communication device 30 is visible from outside the vehicle. The protruding amount of the bead 24 is such that the bead 24 does not contact the resin cover 34.

The resin cover 34 is made of a resin that transmits radio waves, for example, a general-purpose resin such as polypropylene or polycarbonate/polyester. The resin cover 34 is fixed to the roof panel 10 by, for example, adhesion. Needless to say, the resin cover 34 may be fixed to the roof panel 10 by a fastening member such as a bolt or a clip. In this case, the sealing member may be disposed on the outer peripheral portion of the resin cover 34. The upper surface of the resin cover 34 is smoothly continuous with the design surface 12 of the roof panel 10.

A roof head lining 54 is disposed below the antenna plate 38. The roof head lining 54 is a design panel functioning as a ceiling of the cabin 58. In the vicinity of the rear end of the cabin 58, the roof head lining 54 gradually curves downward so as not to interfere with the antenna plate 38 in the course of extending toward the rear side of the vehicle. The roof head lining 54 is bent largely at the bending point 56 and then extends toward rear side of the vehicle.

Figure 4:
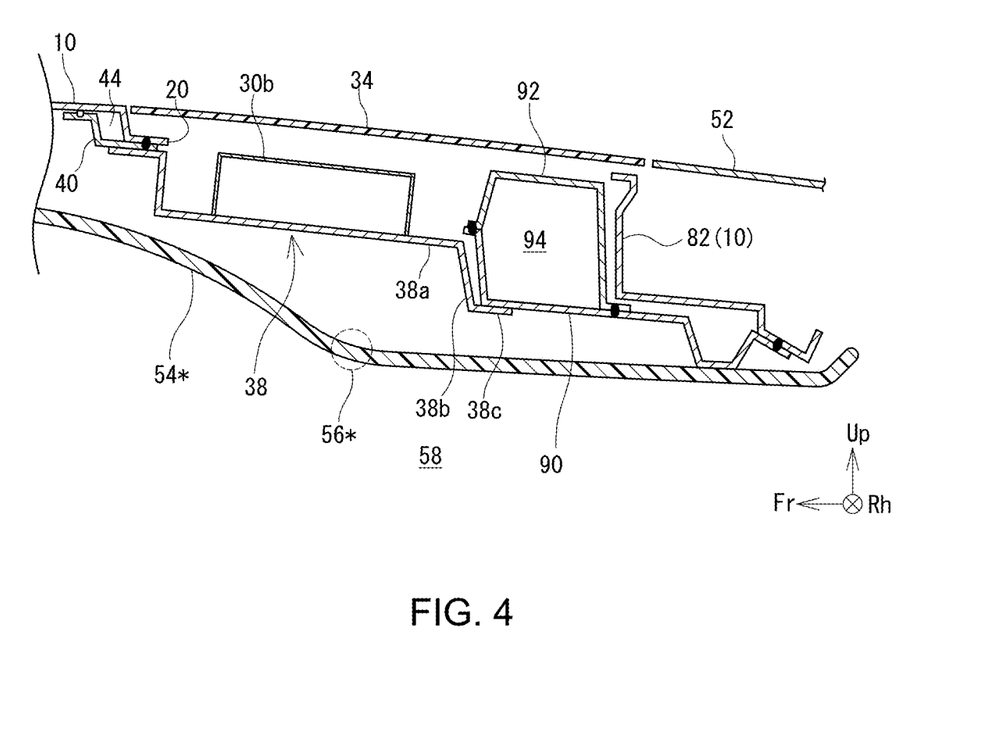
FIG. 4 is a cross-sectional view showing an upper structure of a vehicle according to a reference example.

As apparent from the above description, in the vehicle upper structure disclosed in the present specification, the front end and the rear end of the rear header 60 are joined to the roof panel 10, and the closed spaces 70 and 72 are formed between the rear header 60 and the roof panel 10. The reason for this configuration will be described in comparison with the reference example. FIG. 4 is a cross-sectional view showing an upper structure of a vehicle according to a reference example.

Recently, an on-vehicle communication device 30 (e.g., an antenna 30b) has increased in size for the purpose of improving communication performance. As a result, the size of the communication opening 20 for transmitting radio waves is also increased. Here, when the large communication opening 20 is formed in the roof panel 10, it is needless to say that the rigidity of the whole vehicle body including the roof panel 10 decreases around the communication opening 20. As a result, deformation of the vehicle body may occur around the communication opening 20.

Therefore, in order to improve the rigidity of the vehicle body, it is conceivable to form a skeleton-shaped portion around the communication opening 20. For example, in the reference example shown in FIG. 4, the front closed space 44 is formed near the front end of the communication opening 20, and the rear closed space 94 is formed near the rear end of the communication opening 20. The closed spaces 44 and 94 function as a skeleton-shaped portion. By forming the closed spaces 44 and 94, the section modulus is increased, and the rigidity of the vehicle body around the communication opening 20 is improved.

The vehicle upper structure of the reference example shown in FIG. 4 includes a rear header lower 90 and a rear header upper 92. The rear header upper 92 has a hat-shaped cross-sectional shape opening downward. The rear header upper 92 is disposed above the rear header lower 90. The front end and the rear end of the rear header upper 92 are joined to the rear header lower 90. Thereby, a rear closed space 94 elongated in the vehicle width direction is formed between the rear header upper 92 and the rear header lower 90. With this configuration, the rigidity of the vehicle body in the vicinity of the rear end of the communication opening 20 can be improved.

However, in this case, it is necessary to arrange the rear closed space 94 on the rear side of the communication device 30. Therefore, the placement position of the communication device 30 is shifted toward the front side of the vehicle by the dimension of the rear closed space 94. When the placement position of the communication device 30 deviates toward the front side of the vehicle, the bending point 56* of the roof head lining 54* also deviates toward the front side of the vehicle. Thus, the space of the cabin 58 is narrowed. In particular, the distance between the head of the occupant sitting on the rear seat and the roof head lining 54* (hereinafter referred to as "head clearance") becomes small, and there is a risk of giving a sense of compression to the occupant.

On the other hand, in the case of the vehicle upper structure of this example, the rear closed space 94 does not exist on the rear side of the communication device 30. As a result, the communication device 30 can be disposed on the rear side of the vehicle as compared with the reference example. Thereby, the bending point 56 of the roof head lining 54 can also be disposed on the rear side of the vehicle as compared with the reference example. As a result, the space of the cabin 58, in particular, the head clearance can be widened.

Figure 5:
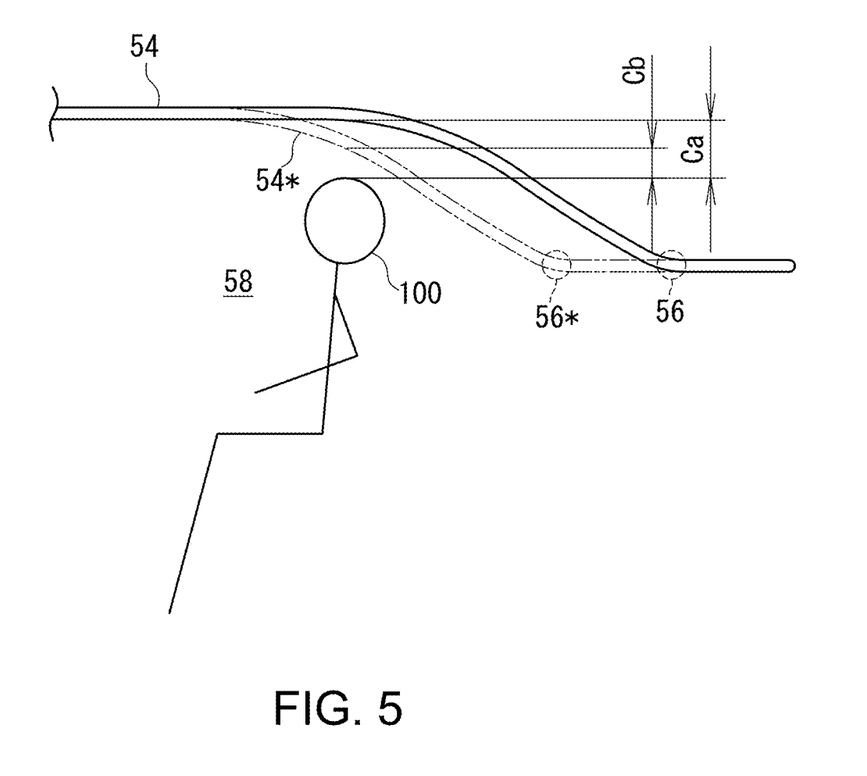
FIG. 5 is a diagram illustrating a difference in head clearance depending on a position of a bending point.

FIG. 5 is a diagram illustrating a difference in head clearance depending on the position of the bending point 56. In FIG. 5, a solid line indicates the roof head lining 54 employed in the vehicle upper structure of the present example, and a two-dotted line indicates the roof head lining 54* employed in the vehicle upper structure of the reference example.

As is apparent from FIG. 5, the bending point 56 in the present example is positioned on the rear side of the vehicle in comparison with the bending point 56* in the reference example. Therefore, the head clearance Ca in this example is significantly larger than the head clearance Cb in the reference example. As a result, according to the vehicle upper structure of the present example, the pressure feeling of the occupant 100 can be greatly reduced.

Incidentally, when the rear closed space 94 is eliminated, the rigidity of the vehicle body in the vicinity of the rear end of the communication opening 20 decreases by a corresponding amount. In this example, in order to prevent such a decrease in rigidity, the rear header 60 is joined to the rear end portion 82 of the roof panel 10. More specifically, as shown in FIG. 3, the rear header 60 is joined to the roof panel 10 at the rear end (i.e., the first joining point 74) and the front end (i.e., the second joining point 76) thereof. Thereby, the first closed space 70 is formed between the groove-shaped portion 68 of the rear header 60 and the rear wall portion 88 of the roof panel 10. Since the first closed space 70 functions as a skeleton-shaped portion, the rigidity of the vehicle body in the vicinity of the rear end of the communication opening 20 is improved by forming the first closed space 70.

The rear header 60 is also joined to the roof panel 10 at the second joining point 76 located at the vertical wall portion 64. By providing the second joining point 76 in the vertical wall portion 86 extending in the vertical direction, the rigidity of the vehicle body in the vicinity of the rear end of the communication opening 20 can be improved while suppressing the dimension in the vehicle longitudinal direction. As a result, the space of the cabin 58 and the head clearance can be sufficiently ensured while ensuring the rigidity.

Further, a second closed space 72 is formed between the second joining point 76 and the third joining point 78. With this configuration, the second closed space 72 functions as a second skeleton-shaped portion. Thus, the rigidity of the vehicle body in the vicinity of the rear end of the communication opening 20 can be further improved.

Here, if the torsional rigidity of the vehicle body is low, the match box deformation tends to occur. The match box deformation is a phenomenon in which the entire vehicle body is deformed like a match box which is collapsed obliquely. In order to suppress such a match box deformation, it is required that the rigidity of the vehicle body is high at an end portion in the vehicle width direction, that is, at a so-called corner portion. Therefore, in this example, the density of the joining points 74, 76, 78 at the end region in in the vehicle width direction Re (see FIG. 1) is higher than the density of the joining points 74, 76, 78 at the center region in the vehicle width direction Rc. For example, a plurality of first joining points 74 are set at intervals in the vehicle width direction. The interval between the plurality of first joining points 74 in the vehicle width direction may be changed according to the position in the vehicle width direction. For example, the interval at end region in the vehicle width direction Re may be narrower than the interval at center region in the vehicle width direction Rc. The same applies to the second joining point 76 and the third joining point 78. Further, at the end region in the vehicle width direction Re, a plurality of joining points 74, 76, 78 may be provided at intervals in the vertical direction or the front-rear direction. For example, at the end region in the vehicle width direction Re, a plurality of second joining points 76 may be provided at intervals in the vertical direction. By providing many joining points 74, 76, 78 at the end portion in the vehicle width direction, the rigidity at the end portion in the vehicle width direction can be improved. As a result, the match box deformation can be effectively suppressed.

In the vehicle upper structure of this example, the rear portion of the antenna plate 38 is formed in a substantially L-shape having a hanging portion 38b and a terminal portion 38c. With such a configuration, the section modulus of the antenna plate 38 can be increased while effectively utilizing the space. That is, around the communication device 30, both the roof head lining 54 and the roof panel 10 extend downward as they approach the rear end of the vehicle. Therefore, there is no spatial margin above the rear portion of the antenna plate 38. On the other hand, there is a space margin under the rear portion of the antenna plate 38. In this example, since the rear portion of the antenna plate 38 extends toward the lower side of the rear portion of the antenna plate 38 having the spatial margin, the vertical dimension of the antenna plate 38 can be increased without narrowing the cabin 58. As a result, the space can be effectively utilized while the rigidity of the vehicle body around the communication opening 20 is kept high.

Any of the configurations described above is an example. Other configurations may be varied as long as the rear header 60 is joined to the roof panel 10 at its front and rear ends and a first closed space 70 is formed between the rear header 60 and the roof panel 10. For example, the second joining point 76 and the second closed space 72 may be eliminated. In the above description, the recessed portions 22 and the beads 24 are disposed on both sides of the communication opening 20 in the vehicle width direction. Further, the shape of each member may be appropriately changed.

REFERENCE SIGNS LIST 10 roof panel, 12 design surface, 14 placement surface, 20 communication opening, 22 recessed portion, 24 bead, 30 communication device, 30a communication module, 30b antenna, 34 resin cover, 38 antenna plate, 38a mounting portion, 38b hanging portion, 38c terminal portion, 40 roof reinforcement, 44 closed space, 50 side member outer panel, 52 rear panel, 54 roof head lining, 56 bending point, 58 cabin, 60 rear header, 62 front wall portion, 64 vertical wall portion, 66 rear wall portion, 68 groove-shaped portion, 70 closed spaces, 72 second closed space, 74 first joining point, 76 second joining point, 78 third joining point, 82 rear end portion, 84 front wall portion, 86 vertical wall portion, 88 rear wall portion, 90 rear header lower, 92 rear header upper, 94 rear closed space, 100 occupant.

The invention claimed is:

1. A vehicle upper structure comprising:
a roof panel having a communication opening formed therein;
a roof reinforcement disposed near a front end of the communication opening and joined to the roof panel;
a rear header disposed near a rear end of the communication opening and joined to the roof panel; and
an antenna plate that supports a communication device and is connected to the roof reinforcement and the rear header,
wherein the rear header is joined to the roof panel at a front end and a rear end thereof, and forms a first closed space elongated in a vehicle width direction between the rear header and the roof panel, wherein
the rear header comprising:
a front wall portion;
a vertical wall portion extending from a rear end of the front wall portion toward a lower side of the vehicle;
a rear wall portion extending from a lower end of the vertical wall portion toward a rear side of the vehicle; and
a groove-shaped portion formed in the rear wall portion and forming the first closed space between the groove-shaped portion and the roof panel, and
wherein the rear header is joined to the roof panel at a first joining point located at a rear side of the vehicle relative to the groove-shaped portion, a second joining point located at the vertical wall portion, and a third joining point located at the front wall portion.

2. The vehicle upper structure according to claim 1, wherein
the rear header forms a second closed space between the rear header and the roof panel at a portion between the second joining point and the third joining point.

3. The vehicle upper structure according to claim 1, wherein:

the antenna plate includes a mounting portion to which the communication device is mounted, a hanging portion extending from a rear end of the mounting portion toward a lower side of the vehicle, and a terminal portion extending from a lower end of the hanging portion toward a rear side of the vehicle; and a terminal portion of the antenna plate is connected to the rear wall portion of the rear header.

4. A vehicle upper structure comprising:

a roof panel having a communication opening formed therein;

a roof reinforcement disposed near a front end of the communication opening and joined to the roof panel;

a rear header disposed near a rear end of the communication opening and joined to the roof panel; and an antenna plate that supports a communication device and is connected to the roof reinforcement and the rear header, wherein the rear header is joined to the roof panel at a front end and a rear end thereof, and forms a first closed space elongated in a vehicle width direction between the rear header and the roof panel, wherein a density of a joining point between the rear header and the roof panel at an end region in the vehicle width direction of the roof panel is higher than the density of the joining point at a center region in the vehicle width direction of the roof panel.

\* \* \* \* \*